(12) United States Patent
Zhu et al.

(10) Patent No.: US 10,056,753 B2
(45) Date of Patent: Aug. 21, 2018

(54) ELECTRO-STATIC DISCHARGE FILTERING CIRCUIT AND METHOD, RESET CIRCUIT, AND ELECTRONIC DEVICE

(71) Applicant: Fairchild Semiconductor Corporation, San Jose, CA (US)

(72) Inventors: Peng Zhu, Tianjin (CN); Lei Huang, Beijing (CN); Yongliang Li, Beijing (CN)

(73) Assignee: Fairchild Semiconductor Corporation, Phoenix, AZ (US)

( * ) Notice: Subject to any disclaimer, the term of this patent is extended or adjusted under 35 U.S.C. 154(b) by 555 days.

(21) Appl. No.: 14/622,320

(22) Filed: Feb. 13, 2015

(65) Prior Publication Data

US 2015/0236503 A1    Aug. 20, 2015

(30) Foreign Application Priority Data

Feb. 14, 2014   (CN) .......................... 2014 1 0062071
Mar. 25, 2014   (CN) .......................... 2014 1 0122946

(51) Int. Cl.
     *H02H 9/04*              (2006.01)
(52) U.S. Cl.
     CPC .................................. *H02H 9/046* (2013.01)
(58) Field of Classification Search
     CPC ........... H02H 9/04; H02H 9/041; H02H 9/046
     USPC .......................................................... 361/56
     See application file for complete search history.

(56) References Cited

U.S. PATENT DOCUMENTS

| | | | |
|---|---|---|---|
| 5,514,612 A * | 5/1996 | Rao ..................... | H01L 27/0248 |
| | | | 438/382 |
| 5,892,717 A | 4/1999 | Malarsie | |
| 6,873,017 B2 | 3/2005 | Cai et al. | |
| 7,477,497 B2 | 1/2009 | Botula | |
| 7,682,918 B2 | 3/2010 | Cai et al. | |
| 7,778,000 B2 * | 8/2010 | Scheffler ............... | H02H 3/023 |
| | | | 361/117 |
| 8,238,067 B2 | 8/2012 | Drapkin et al. | |
| 8,599,525 B2 | 12/2013 | Bennett et al. | |
| 8,995,101 B2 | 3/2015 | Demange | |
| 9,093,977 B2 * | 7/2015 | Jin .......................... | H03H 7/40 |
| 2005/0135033 A1 * | 6/2005 | Kitagawa ............ | H01L 27/0266 |
| | | | 361/91.1 |
| 2007/0133138 A1 * | 6/2007 | Kamizawa ............ | H02H 3/087 |
| | | | 361/58 |
| 2010/0123984 A1 | 5/2010 | Lin | |
| 2012/0092798 A1 | 4/2012 | Hwang | |

FOREIGN PATENT DOCUMENTS

| | | |
|---|---|---|
| CN | 100527410 C | 8/2009 |
| CN | 101741075 A | 10/2009 |
| CN | 102456686 A | 8/2011 |

* cited by examiner

*Primary Examiner* — Dharti Patel
(74) *Attorney, Agent, or Firm* — Brake Hughes Bellermann LLP

(57) ABSTRACT

This document discusses, among other things, an electrostatic discharge (EDS) filtering circuit and method, a reset circuit, and an electronic device. The ESD filtering circuit comprises a first current dividing circuit and a second current dividing circuit which respectively share a current of a first power source signal and aggregate the shared currents to form a second power source signal upon filtering, wherein a voltage drop of the first current dividing circuit is constant and the second current dividing circuit is a pure resistor element circuit.

19 Claims, 6 Drawing Sheets

ELECTRO-STATIC DISCHARGE FILTERING CIRCUIT AND METHOD, RESET CIRCUIT, AND ELECTRONIC DEVICE

CLAIM OF PRIORITY

The application claims the benefit of priority under 35 U.S.C. § 119(a) to Peng Zhu et al. CN Application Nos. 201410062071.4, filed on Feb. 14, 2014, and 201410122946.5, filed on Mar. 25, 2014, which are hereby incorporated by reference in their entirety.

TECHNICAL FIELD

The present invention relates to technologies of electro-static discharge (ESD), and in particular, relates to an ESD filtering circuit and method, a reset circuit, and an electronic device.

BACKGROUND

Electro-static discharge (ESD) is an objective natural phenomenon, which may be caused in such ways as contact, friction, and the like. ESD is characterized by high voltage, low power, small current, and short action time.

With the ever increasing integration of electronic elements, hazards caused by ESD on electronic elements in the integrated circuits arouse increasing focus on product design and manufacturing.

In digital circuits, if high ESD occurs at a power source of a digital circuit, it can easily cause a relatively low pulse peak for the power source signal of the digital circuit against the power source ground. As a result, the digital circuit may not normally work, or even may be damaged.

OVERVIEW

This document discusses, among other things, an electro-static discharge (EDS) filtering circuit and method, a reset circuit, and an electronic device.

In an example, the ESD filtering circuit comprises a first current dividing circuit and a second current dividing circuit, wherein the first current dividing circuit and the second current dividing circuit are configured to, respectively share a current of a first power source signal, and aggregate the shared currents to form a second power source signal upon filtering, and wherein a voltage drop of the first current dividing circuit is constant and the second current dividing circuit is a pure resistor element circuit.

In an example, the ESD filtering method comprises respectively sharing, by the first current dividing circuit and the second current dividing circuit, a current of a first power source signal, and aggregating the shared currents to form a second power source signal upon filtering, wherein a voltage drop of the first current dividing circuit is constant and the second current dividing circuit is a pure resistor element circuit, and when ESD causes a voltage of the first power source signal to instantly drop, limiting, by the second current dividing circuit, the shared current at the instant.

In an example, the reset circuit comprises an ESD filtering circuit and a reset signal generation circuit, wherein the ESD filtering circuit comprises a first current dividing circuit and a second current dividing circuit, wherein the first current dividing circuit and the second current dividing circuit are configured to respectively share a current of a first power source signal, aggregate the shared currents to form a second power source signal upon filtering, and provide the second power source signal to the reset signal generation circuit, wherein a voltage drop of the first current dividing circuit is constant and the second current dividing circuit is a pure resistor element circuit, and the reset signal generation circuit is configured to receive the second power source signal as a working power source, and generate a reset signal upon receiving a reset trigger signal.

In an example, the electronic device comprises a reset circuit and at least one functional circuit, wherein the reset circuit comprises an ESD filtering circuit and a reset signal generation circuit, wherein the ESD filtering circuit comprises a first current dividing circuit and a second current dividing circuit, wherein the first current dividing circuit and the second current dividing circuit are configured to: respectively share a current of a first power source signal, aggregate the shared currents to form a second power source signal upon filtering, and provide the second power source signal to the reset signal generation circuit, wherein a voltage drop of the first current dividing circuit is constant and the second current dividing circuit is a pure resistor element circuit, and the reset signal generation circuit is configured to receive the second power source signal as a working power source, generate a reset signal upon receiving a reset trigger signal, and provide the reset signal to the functional circuit, and the functional circuit is configured to perform signal processing, and reset the circuit thereof upon receiving the reset signal generated by the reset signal generation circuit.

With the ESD filtering circuit and method, the reset circuit, and the electronic device, a first current dividing circuit and a second current dividing circuit in the ESD filtering circuit respectively share a current of the first power source signal and aggregate the shared currents to form a second power source signal upon filtering, wherein a voltage drop of the first current dividing circuit is constant and the second current dividing circuit is a pure resistor element circuit. In this way, when ESD causes a voltage of the first power source signal to instantly drop, the first current dividing circuit does not share the current at the instant and the second current dividing circuit limits the shared current at the instant to reduce the speed at which the voltage of the second power source signal decreases with the voltage of the first power source signal, such that the second power source signal is not subjected to a relatively low voltage peak. This ensures that a digital circuit which uses the second power source signal as a power supply voltage is capable of normally working, and prevents the digital circuit from being damaged due to presence of ESD.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In an example, a first current dividing circuit and a second current dividing circuit respectively share a current of a first power source signal and aggregate the shared currents to form a second power source signal upon filtering, wherein a voltage drop of the first current dividing circuit is constant and the second current dividing circuit is a pure resistor element circuit, when ESD causes a voltage of the first power source signal to instantly drop, the first current dividing circuit does not share the current at the instant and the second current dividing circuit limits the shared current at the instant to reduce the speed at which the voltage of the second power source signal decreases with the voltage of the first power source signal.

Figure 1:
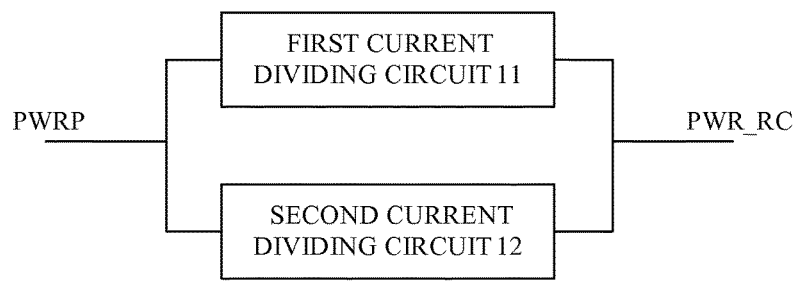
FIG. 1 is a schematic diagram of an ESD filtering circuit according to an embodiment.

An embodiment provides an ESD filtering circuit. As illustrated in FIG. 1, the circuit comprises a first current dividing circuit 11 and a second current dividing circuit 12.

The first current dividing circuit 11 and the second current dividing circuit 12 are connected in parallel to receive a first power source signal PWRP, and are configured to respectively share a current of the first power source signal PWRP, and aggregate the shared currents to form a second power source signal PWR_RC upon filtering, wherein a voltage drop of the first current dividing circuit 11 is constant and the second current dividing circuit 12 is a pure resistor element circuit.

Figure 2:
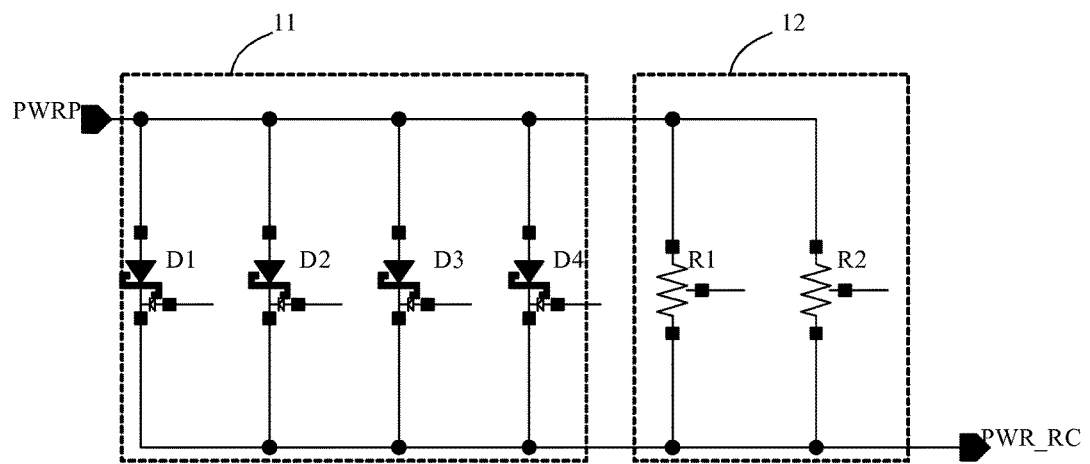
FIG. 2 is a schematic diagram of element connection of the ESD filtering circuit according to an embodiment.

The first current dividing circuit 11 can include at least two diodes, wherein a positive pole of the diode receives the first power source signal and a negative pole of the diode is an output terminal. When the first current dividing circuit 11 is composed of more than two diodes, the diodes may be connected in parallel. The diode can include a Schottky barrier diode. A voltage drop of the Schottky barrier diode is typically constantly between 0.15V and 0.45 V. FIG. 2 illustrates an example where four Schottky barrier diodes D1, D2, D3, D4 are connected in parallel to form the first current dividing circuit 11.

The second current dividing circuit 12 can include at least one resistor, wherein one terminal of the resistor receives the first power source signal and the other terminal of the resistor is an output terminal. When the second current dividing circuit 12 is composed of more than two resistors, the resistors may be connected in parallel. In an example, the resistances of the resistors can be set to ensure that the resistance of the second current dividing circuit 12 is greater than a conductive resistance of the first current dividing circuit 11. FIG. 2 illustrates an example where two resistors R1 and R2 are connected in parallel to form the second current dividing circuit 12.

In the ESD filtering circuit as illustrated in FIG. 2, if the voltage of the first power source signal PWRP instantly drops under impact of ESD, the Schottky barrier diode of the first current dividing circuit 11 is not conducted. In this way, the majority of the current of the first power source signal PWRP is shared by the second current dividing circuit 12 at the instant, and the two resistors R1 and R2 in the second current dividing circuit 12 limit the shared current. In this case, the speed of the voltage drop of the second power source signal PWR_RC will be far less than the speed of the voltage drop of the first power source signal PWRP at the instant, and thus no low voltage peak will be present.

Similarly, when the ESD filtering circuit as illustrated in FIG. 2 needs to output the second power source signal PWR_RC having a large current, for example, when the circuit is powered on, the Schottky barrier diode of the first current dividing circuit 11 can share the majority of the current of the first power source signal PWRP to satisfy the current needs of the second power source signal PWR_RC. Herein, the large current refers to a current that is greater than a ratio of the voltage drop of the first current dividing circuit 11 to the resistance of the second current dividing circuit 12.

Figure 3:
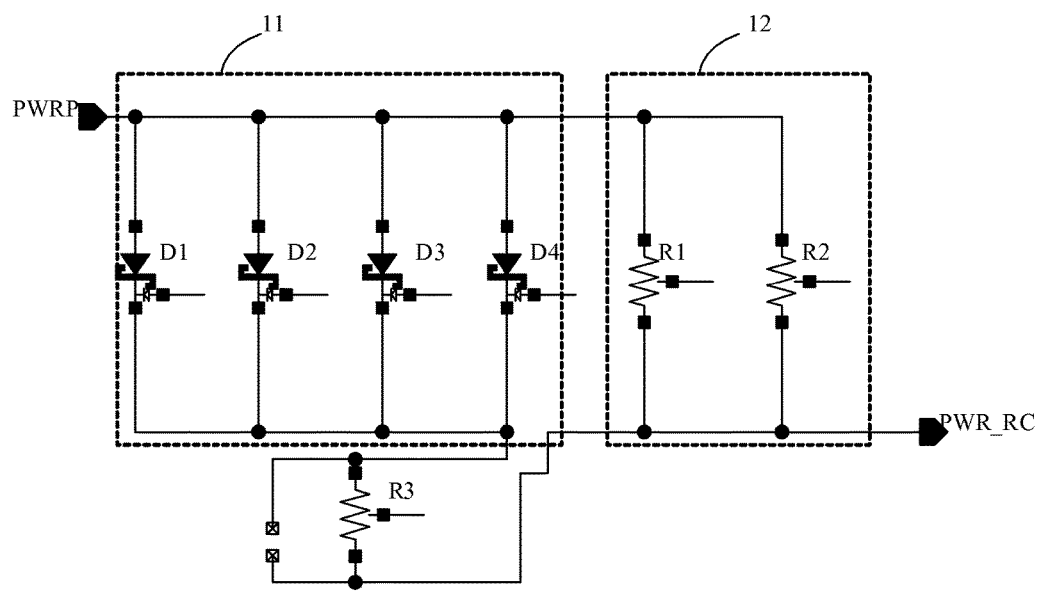
FIG. 3 is a schematic diagram of element connection of an ESD filtering circuit having a current limiting resistor according to an embodiment.

Based on the ESD filtering circuit as illustrated in FIG. 2, a current limiting element may be further connected between the first current dividing circuit 11 and the second current dividing circuit 12. As illustrated in FIG. 3, the current limiting element is a current limiting resistor R3, wherein the current limiting resistor R3 may limit a current provided by the first current dividing circuit 11.

Figure 4:
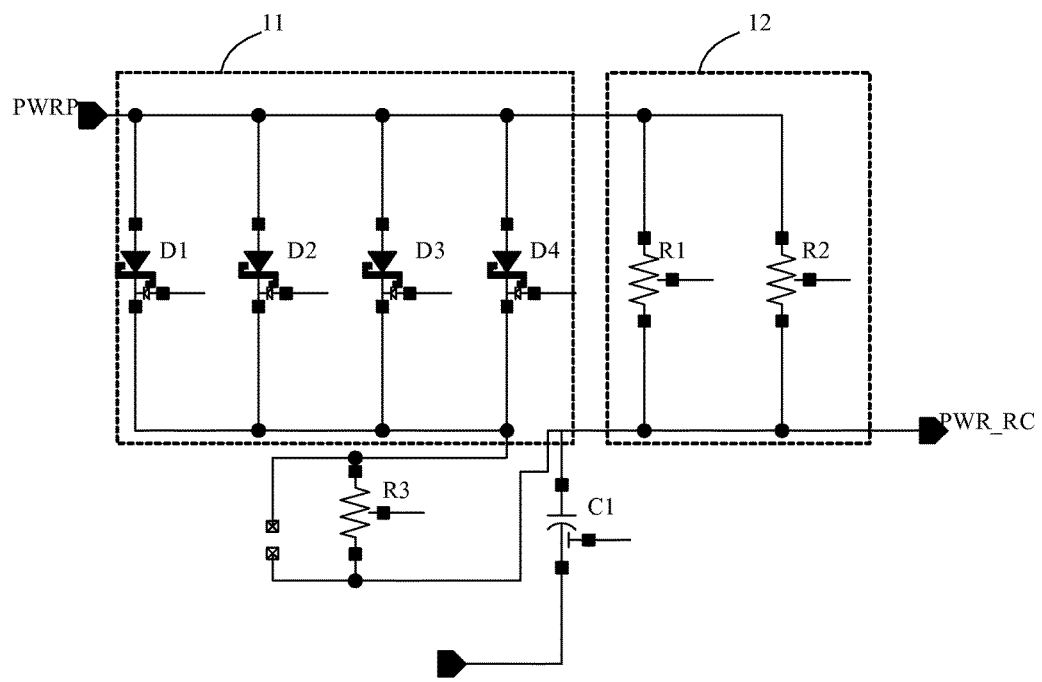
FIG. 4 is a schematic diagram of element connection of an ESD filtering circuit having a filter capacitor according to an embodiment.

In addition, based on the ESD filtering circuit as illustrated in FIG. 2, a filter element may be further connected between the second power source signal PWR_RC and a power source ground. As illustrated in FIG. 4, the filter element can include a capacitor C1, wherein the capacitor C1 may filter the second power source signal PWR_RC.

Figure 5:
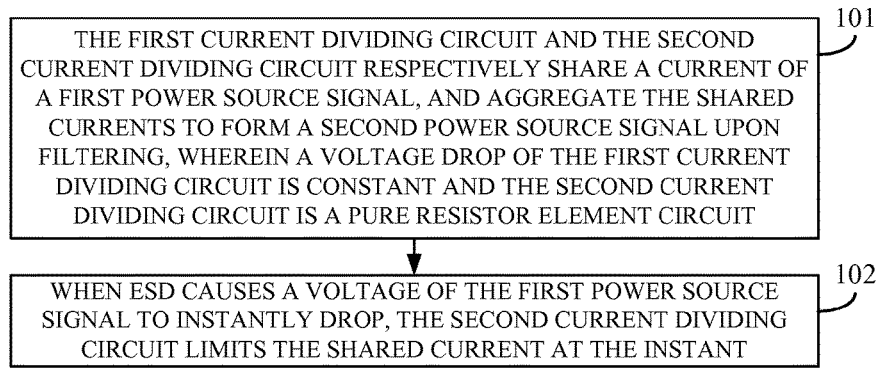
FIG. 5 is a schematic flowchart of an ESD filtering method according to an embodiment.

Based on the above ESD filtering circuit, an embodiment provides an ESD filtering method. As illustrated in FIG. 5, the method can include the following steps:

Step 101: The first current dividing circuit and the second current dividing circuit respectively share a current of a first power source signal, and aggregate the shared currents to form a second power source signal upon filtering, wherein a voltage drop of the first current dividing circuit is constant and the second current dividing circuit is a pure resistor element circuit.

Step 102: When ESD causes a voltage of the first power source signal to instantly drop, the second current dividing circuit limits the shared current at the instant.

In the above method, the first current dividing circuit can include at least one diode. When the first current dividing circuit is composed of more than two diodes, the diodes may be connected in parallel. The diode can include a Schottky barrier diode, wherein a voltage drop of the Schottky barrier diode is typically constantly between 0.15 V and 0.45 V.

The second current dividing circuit can include at least one resistor. When the second current dividing circuit is composed of more than two resistors, the resistors may be connected in parallel. In an example, the resistances of the resistors can be set such that it is ensured that the resistance of the second current dividing circuit is greater than a conductive resistance of the first current dividing circuit.

In an example, a current limiting element may be further connected to the first current dividing circuit and the second current dividing circuit, to limit a current provided by the first current dividing circuit, wherein the current limiting element may be a current limiting resistor.

In addition, a filter element may be further connected between the second power source signal and a power source ground for filtering, wherein the filter element may be a capacitor.

In an example, in the ESD filtering method, if the voltage of the first power source signal instantly drops under impact of ESD, the Schottky barrier diode of the first current dividing circuit is not conducted. In this way, the majority of the current of the first power source signal can be shared by the second current dividing circuit at the instant, and the two resistors in the second current dividing circuit limit the shared current. In this case, the speed of the voltage drop of the second power source signal will be far less than the speed of the voltage drop of the first power source signal at the instant, and thus no low voltage peak will be present.

Figure 6:
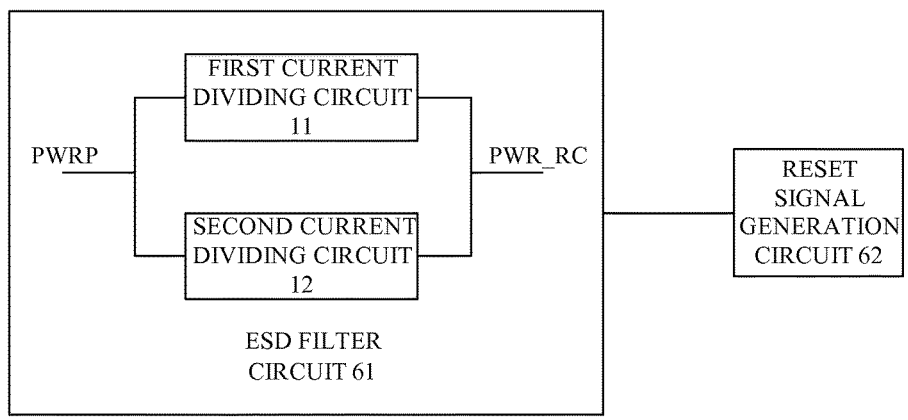
FIG. 6 is a schematic diagram of a reset circuit according to an embodiment.

Based on the above ESD filtering circuit, an embodiment further provides a reset circuit. As illustrated in FIG. 6, the circuit comprises an ESD filtering circuit 61 and a reset signal generation circuit 62. The ESD filtering circuit 61 can include a first current dividing circuit 11 and a second current dividing circuit 12.

The first current dividing circuit 11 and the second current dividing circuit 12 can be connected in parallel to receive a first power source signal PWRP, and can be configured to respectively share a current of the first power source signal PWRP, aggregate the shared currents to form a second power source signal PWR_RC upon filtering, and provide the second power source signal PWR_RC to the reset signal generation circuit 62, wherein a voltage drop of the first current dividing circuit 11 is constant and the second current dividing circuit 12 is a pure resistor element circuit.

The reset signal generation circuit 62 can be configured to receive the second power source signal PWR_RC as a working power source, and generate a reset signal upon receiving a reset trigger signal.

The first current dividing circuit 11 can include at least two diodes, wherein a positive pole of the diode receives the first power source signal and a negative pole of the diode is an output terminal. When the first current dividing circuit 11 is composed of more than two diodes, as illustrated in FIG. 2, the diodes may be connected in parallel. The diode can include a Schottky barrier diode. A voltage drop of the Schottky barrier diode is typically constantly between 0.15V and 0.45 V.

The second current dividing circuit 12 can include at least one resistor. When the second current dividing circuit 12 is composed of more than two resistors, as illustrated in FIG. 2, the resistors may be connected in parallel. In an example, the resistances of the resistors can be set such that it is ensured that the resistance of the second current dividing circuit 12 is greater than a conductive resistance of the first current dividing circuit 11.

A current limiting element may be further connected between the first current dividing circuit 11 and the second current dividing circuit 12. As illustrated in FIG. 3, the current limiting element is a current limiting resistor R3, wherein the current limiting resistor R3 may limit a current provided by the first current dividing circuit 11.

In addition, a filter element may be further connected between the second power source signal PWR_RC and a power source ground. As illustrated in FIG. 4, the filter element is a capacitor C1, wherein the capacitor C1 may filter the second power source signal PWR_RC.

The reset signal generation circuit 62 can be configured to serially connect a delay resistor between a reset charging capacitor of the reset signal generation circuit and the second power source signal PWR_RC, wherein the delay resistor prolongs the charging completion time of the reset charging capacitor, such that the reset charging capacitor is not sensitive to an instant high voltage of the second power source signal PWR_RC to the power source ground.

Figure 7:
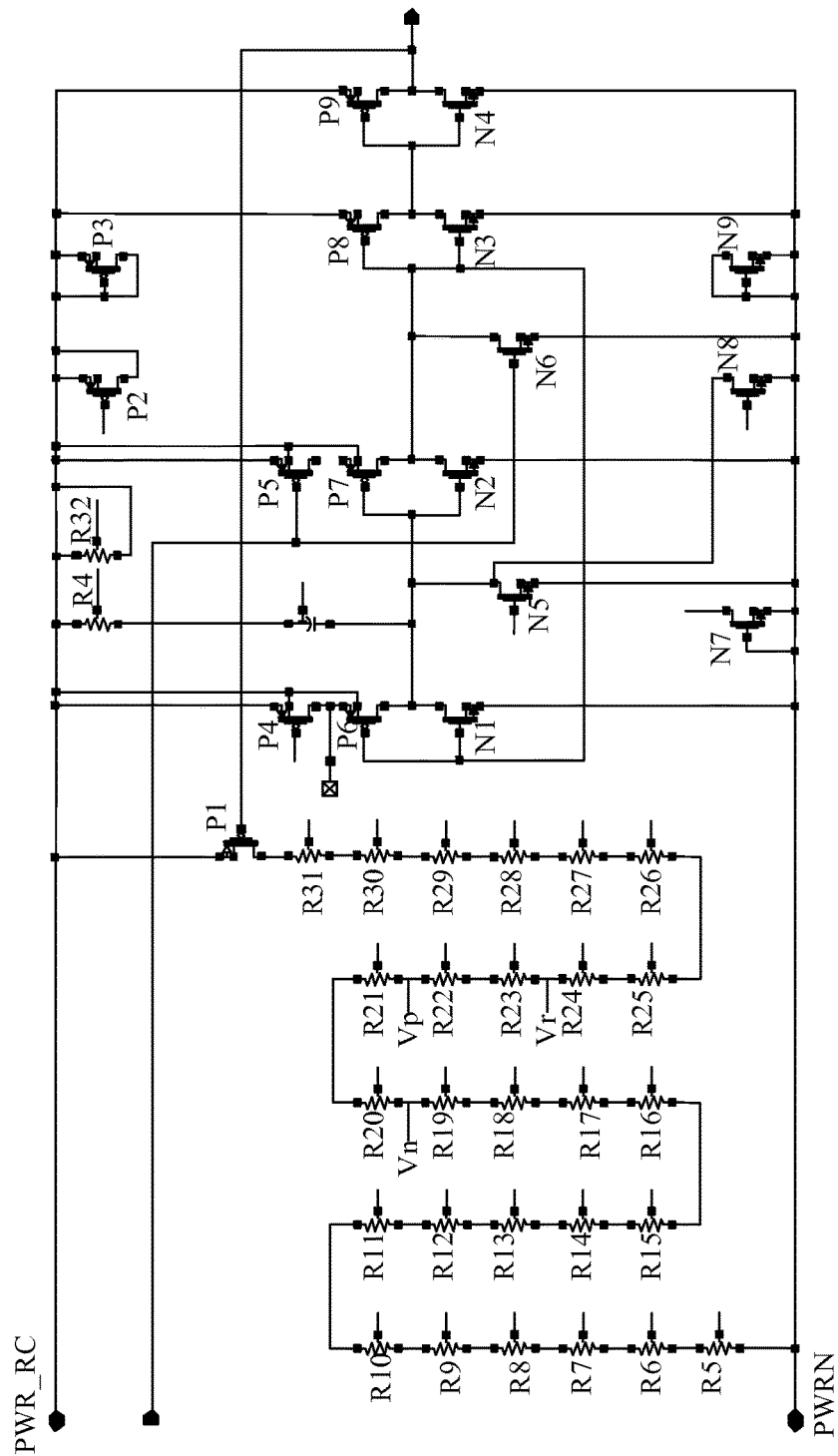
FIG. 7 is a schematic diagram of a reset signal generation circuit according to an embodiment.

FIG. 7 illustrates a specific embodiment of the reset signal generation circuit 62. The reset signal generation circuit 62 comprises a first p-channel metal-oxide-semiconductor (PMOS) P1 to a ninth PMOS P9, and a first n-channel metal-oxide-semiconductor (NMOS) N1 to a ninth NMOS N9, a fifth resistor R5 to a thirty-second resistor R32, a delay resistor R4, and a reset charging capacitor C2. The delay resistor R4 is serially connected between the reset charging capacitor C2 and the second power source signal PWR_RC, and is capable of enabling a smaller current to flow into the reset charging capacitor C2 when the second power source PWR_RC is subjected to an instant high voltage against the power source ground. This can prolong the charging completion time of the reset charging capacitor C2, prevent the reset charging capacitor C2 from being charged completely at the instant, raise up the gate voltages of the seventh PMOS P7 and the second NMOS N2, such that a low level reset signal is generated at the output terminal.

Figure 8:
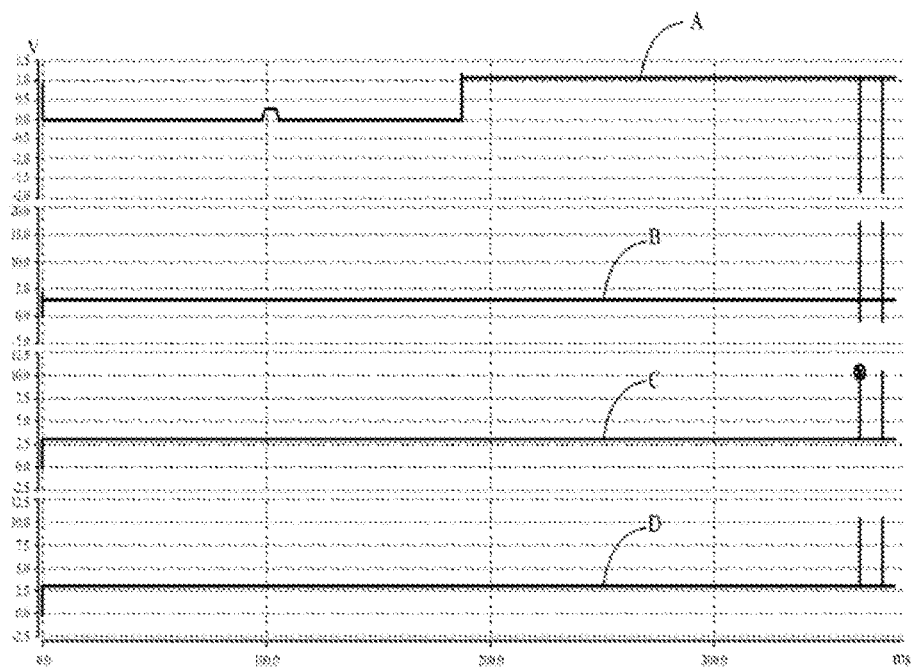
FIG. 8 is a schematic diagram of a simulation result of an ESD filtering circuit and a reset circuit in case of −8 kV ESD according to an embodiment.

FIG. 8 illustrates a simulation result of an ESD filtering circuit and a reset circuit in case of −8 kV ESD, including curves a-d. In FIG. 8, curve a indicates a voltage of an interference source, curve b indicates a voltage of the first power source signal PWRP, curve c indicates a voltage of the second power source PWR_RC, and curve d indicates an output voltage of the reset circuit. In this example, the voltage of the first power source signal PWRP is 3 V under normal circumstances. When the −8 kV ESD is present, due to the impact of the parasitic inductor of the circuit, the voltage of the interference source instantly drops to −2 V, the voltage of the first power source signal PWRP instantly rises to 17 V and then drops to −0.9 V. Upon filtering of the ESD filtering circuit, the voltage of the second power source signal PWR_RC only instantly rises to 10.5 V, and then drops to the normal value 2.6 V. The output voltage of the reset circuit is subjected to an about 10.5 V voltage peak instantly, but no low level voltage peak close to 0 V is present, and hence no reset signal is generated mistakenly.

Figure 9:
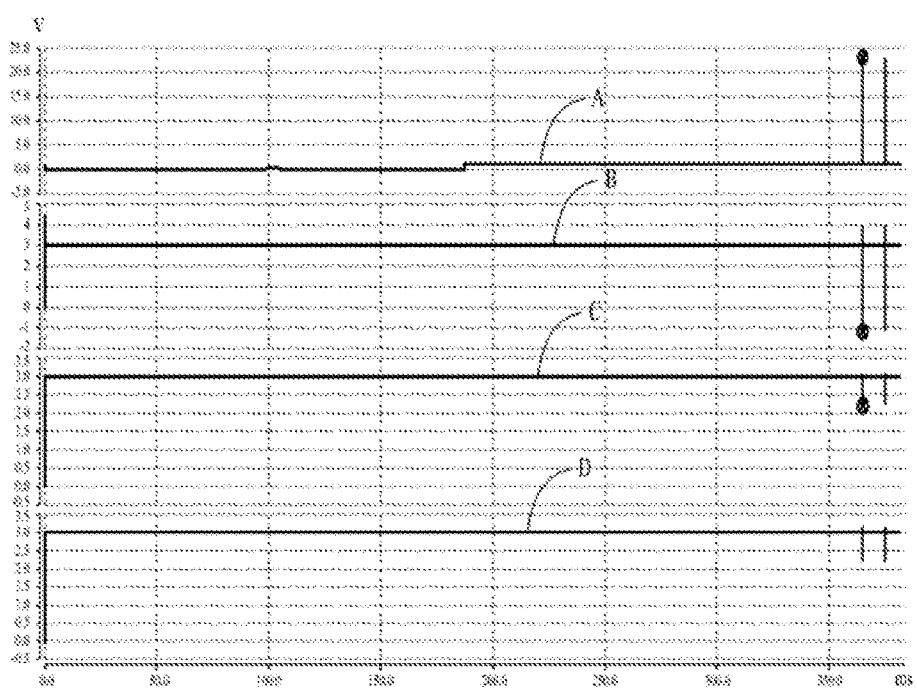
FIG. 9 is a schematic diagram of a simulation result of an ESD filtering circuit and a reset circuit in case of +8 kV ESD according to an embodiment.

FIG. 9 illustrates a simulation result of an ESD filtering circuit and a reset circuit in case of +8 kV ESD, including curves a-d. In FIG. 9, curve a indicates a voltage of an interference source, curve b indicates a voltage of the first power source signal PWRP, curve c indicates a voltage of the second power source PWR_RC, and curve d indicates an output voltage of the reset circuit. In this example, the voltage of the first power source signal PWRP is 3 V under normal circumstances. When the +8 kV ESD is present, due to the impact of the parasitic inductor of the circuit, the voltage of the interference source instantly rises to 22.5 V, the voltage of the first power source signal PWRP instantly drops to −1.05V. Upon filtering of the ESD filtering circuit, the voltage of the second power source signal PWR_RC only instantly drops to 2.25 V, which does not affect normal working of a digital circuit using the second power source signal PWR_RC as a power supply voltage. The output voltage of the reset circuit instantly drops to about 2.25 V, but no low level voltage peak close to 0 V is present, and hence no reset signal is generated mistakenly.

Figure 10:
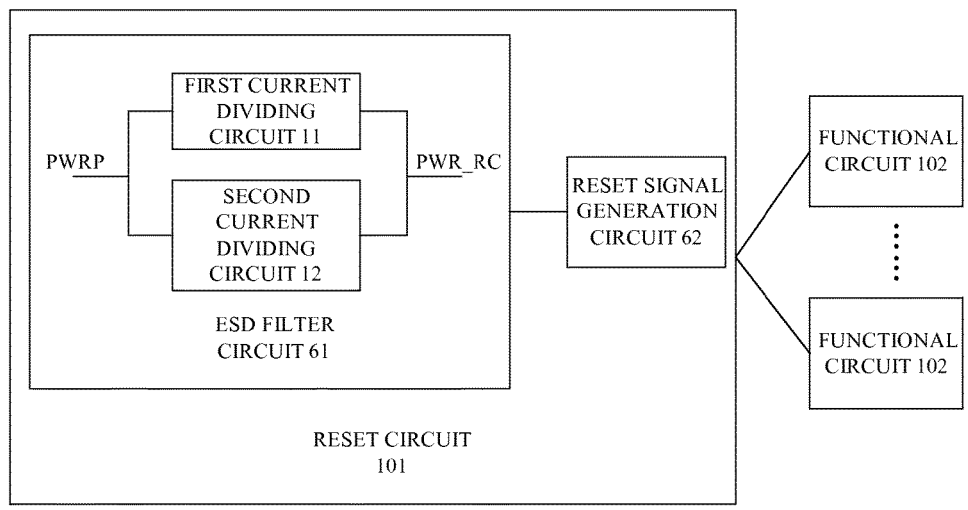
FIG. 10 is a schematic diagram of the result of an electronic device according to an embodiment.

FIG. 10 illustrates generally an electronic device comprising a reset circuit 101 and at least one functional circuit 102. The reset circuit 101 comprises an ESD filtering circuit 61 and a reset signal generation circuit 62. The ESD filtering circuit 61 comprises a first current dividing circuit 11 and a second current dividing circuit 12.

The first current dividing circuit 11 and the second current dividing circuit 12 can be connected in parallel to receive a first power source signal PWRP, and can be configured to respectively share a current of the first power source signal PWRP, aggregate the shared currents to form a second power source signal PWR_RC upon filtering, and provide the second power source signal PWR_RC to the reset signal generation circuit 62, wherein a voltage drop of the first current dividing circuit 11 is constant and the second current dividing circuit 12 is a pure resistor element circuit.

The reset signal generation circuit 62 can be configured to receive the second power source signal PWR_RC as a working power source, generate a reset signal upon receiving a reset trigger signal, and provide the reset signal to the functional circuit 102.

In an example, the second power source signal PWR_RC upon filtering may also be transmitted to the at least one functional circuit 102, which provides a power source for the at least one functional circuit 102.

The functional circuit 102 can be configured to perform signal processing, and reset the circuit thereof upon receiving the reset signal generated by the reset signal generation circuit 62. The functional circuit 102 may be a digital-to-analog conversion circuit, an analog-to-digital conversion circuit, a central processing unit (CPU), a signal generator, or the like which is a circuit capable of implementing specific functions. The performed signal processing may be digital-to-analog conversion, analog-to-digital conversion, signal detection and calculation, or the like.

The first current dividing circuit 11 can include at least two diodes, wherein a positive pole of the diode receives the first power source signal and a negative pole of the diode is an output terminal. When the first current dividing circuit 11 is composed of more than two diodes, as illustrated in FIG. 2, the diodes may be connected in parallel. The diode can include a Schottky barrier diode. A voltage drop of the Schottky barrier diode is typically constantly between 0.15V and 0.45 V.

The second current dividing circuit 12 can include at least one resistor. When the second current dividing circuit 12 is composed of more than two resistors, as illustrated in FIG. 2, the resistors may be connected in parallel. In an example, the resistances of the resistors need to be set such that it is ensured that the resistance of the second current dividing circuit 12 is greater than a conductive resistance of the first current dividing circuit 11.

A current limiting element may be further connected between the first current dividing circuit 11 and the second current dividing circuit 12. As illustrated in FIG. 3, the current limiting element is a current limiting resistor R3, wherein the current limiting resistor R3 may limit a current provided by the first current dividing circuit 11.

In addition, a filter element may be further connected between the second power source signal PWR_RC and a power source ground. As illustrated in FIG. 4, the filter element is a capacitor C1, wherein the capacitor C1 may filter the second power source signal PWR_RC.

The reset signal generation circuit 62 can be configured to serially connect a delay resistor between a reset charging capacitor of the reset signal generation circuit and the second power source signal PWR_RC, wherein the delay resistor prolongs the charging completion time of the reset charging capacitor, such that the reset charging capacitor is not sensitive to an instant high voltage of the second power source signal PWR_RC to the power source ground.

With the technical solutions according to the embodiments, in the ESD filtering circuit, the voltage drop of the first current dividing circuit is constant, and the second current dividing circuit is a pure resistor element circuit. As such, when ESD causes the voltage of the first power source signal to instantly drop, the first current dividing circuit does not share the current at the instant and the second current dividing circuit limits the shared current at the instant to reduce the speed at which the voltage of the second power source signal decreases with the voltage of the first power source signal, such that the second power source signal is not subjected to a relatively low voltage peak. This can ensure that a digital circuit, which uses the second power source signal as a power supply voltage, is capable of normally working. In addition, the delay resistor added in the reset circuit prolongs the charging completion time of the reset charging capacitor, such that the reset charging capacitor is not sensitive to an instant high voltage of the second power source signal to the power source ground, and thus no reset signal is generated mistakenly.

ADDITIONAL NOTES AND EXAMPLES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An electrostatic discharge (ESD) protection circuit, comprising:
    an input node;
    an output node;
    a first current dividing circuit including two or more diodes connected in parallel, the first current dividing circuit being connected between the input node and the output node; and
    a second current dividing circuit including two or more resistors connected in parallel, the second current dividing circuit being connected between the input node and the output node,
    the first current dividing circuit being configured to conduct a current from the input node to the output node, and to block a current from the output node to the input node through the first current dividing circuit, and
    the second current dividing circuit being configured to limit a magnitude of a current flowing through the second current dividing circuit.

2. The ESD protection circuit according to claim 1, wherein the second current dividing circuit has a resistance value larger than an on-resistance of the first current dividing circuit.

3. The ESD protection circuit according to claim 1, wherein the first current dividing circuit is configured to conduct the current from the input node to the output node at a constant voltage drop.

4. The ESD protection circuit according to claim 1, wherein a diode of the two or more diodes is a Schottky diode.

5. The ESD protection circuit according to claim 1, further comprising a current limiting element connected between the first current dividing circuit and the second current dividing circuit, the current limiting element being configured to limit a current flowing through the first current dividing circuit.

6. The ESD protection circuit according to claim 1, further comprising a filtering element connected between the output node and ground.

7. An electrostatic discharge (ESD) protection method, comprising:
    when a voltage of a signal at an input node is reduced instantly below a voltage of a signal at an output node:
        blocking a current from the output node to the input node from flowing through a first current dividing circuit;
        causing the current to flow through a second current dividing circuit; and
        limiting a magnitude of the current by using the second current dividing circuit: and
    limiting a magnitude of a current flowing through the first current dividing circuit by using a current limiting element connected between the first current dividing circuit and the second current dividing circuit.

8. The ESD protection method according to claim 7, further comprising:
    conducting a current from the input node to the output node substantially by means of the first current dividing circuit, during a period when the voltage of the signal at the input node is increasing or fixed.

9. The ESD protection method according to claim 7, wherein the blocking the current from the output node to the input node from flowing through the first current dividing circuit comprises:
    blocking the current between the input node and the output node by using at least one diode connected between the input node and the output node.

10. The ESD protection method according to claim 7, wherein the limiting the magnitude of the current comprises:
    limiting the magnitude of the current by using at least one resistor connected between the input node and the output node.

11. The ESD protection method according to claim 7, further comprising:
    filtering the signal at the output node.

12. A reset circuit, comprising:
    an electrostatic discharge (ESD) protection circuit; and
    a reset signal generation circuit,
    the ESD protection circuit including:
        a first input node;
        a first output node;
        a first current dividing circuit, connected between the first input node and the first output node; and
        a second current dividing circuit, connected between the first input node and the first output node,
        the first current dividing circuit being configured to conduct a current from the first input node to the first output node, and to block a current from the first output node to the first input node through the first current dividing circuit, the second current dividing circuit being configured to limit a magnitude of a current flowing through the second current dividing circuit, and wherein the reset signal generation circuit is coupled with the first output node of the ESD protection circuit, the reset signal generation circuit being configured to receive a signal from the first output node as a power supply signal of the reset signal generation circuit.

13. The reset circuit according to claim 12, wherein the second current dividing circuit has a resistance larger than an on-resistance of the first current dividing circuit.

14. The reset circuit according to claim 12, wherein the first current dividing circuit is configured to conduct the current from the first input node to the first output node at a constant voltage drop.

15. The reset circuit according to claim 12, wherein the first current dividing circuit comprises at least one diode with an anode connected to the first input node and a cathode connected to the first output node, and wherein the second current dividing circuit comprises at least one resistor connected between the first input node and the first output node.

16. The reset circuit according to claim 15, wherein the first current dividing circuit comprises two or more diodes connected in parallel with each other, and wherein the second current dividing circuit comprises two or more resistors connected in parallel with each other.

17. The reset circuit according to claim 12, wherein the ESD protection circuit further comprises a current limiting element, connected between the first current dividing circuit and the second current dividing circuit, and configured to limit a current flowing through the first current dividing circuit.

18. The reset circuit according to claim 12, wherein the reset signal generation circuit comprises:

a second input node, connected to the first output node;

a second output node, configured to output a reset signal;

a charging capacitor;

a delay resistor, connected between the second input node and a first terminal of the charging capacitor; and a logic circuit, connected between a second terminal of the charging capacitor and the second output node, and configured to generate the reset signal under control of the charging capacitor.

19. The reset circuit according to claim 12, further comprising:

a functional circuit, wherein the functional circuit is connected to the reset signal generation circuit and configured to receive a reset signal generated by the reset signal generation circuit.

* * * * *